J. T. ANDERSON.
JAR MOLDING MACHINE.
APPLICATION FILED DEC. 14, 1914.

1,254,385.

Patented Jan. 22, 1918.
7 SHEETS—SHEET 5.

Witnesses:
Henry Burmann
Fredk W. Miller

Inventor
John T. Anderson
Per A B Freier
Attorney

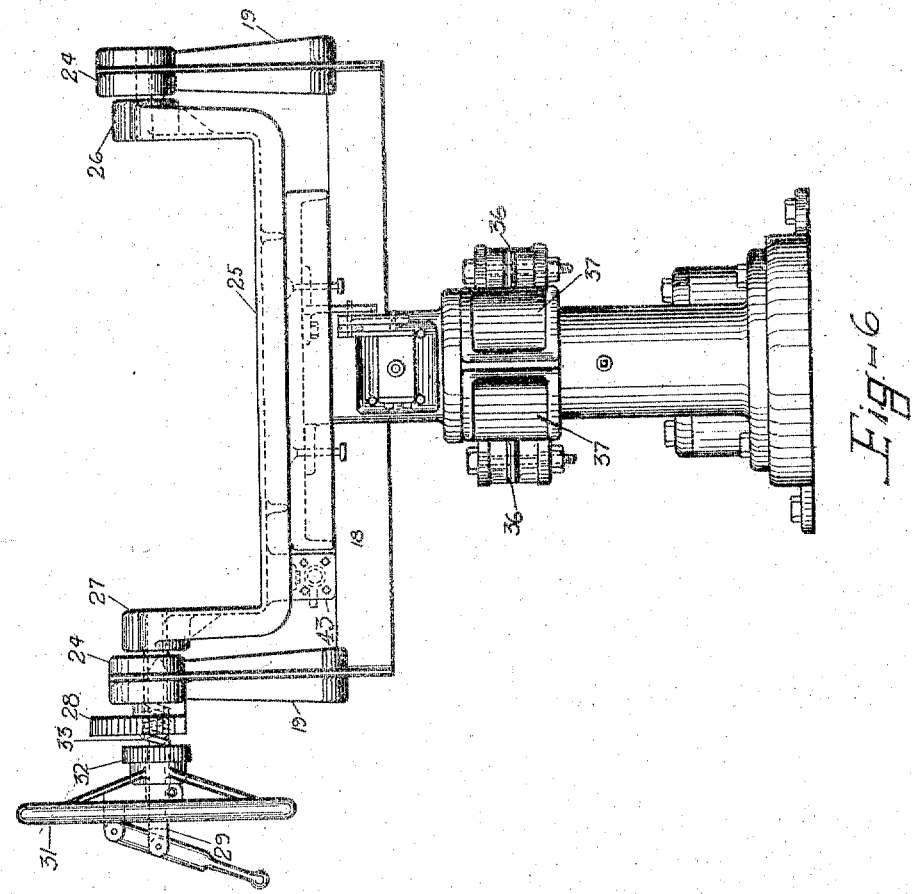

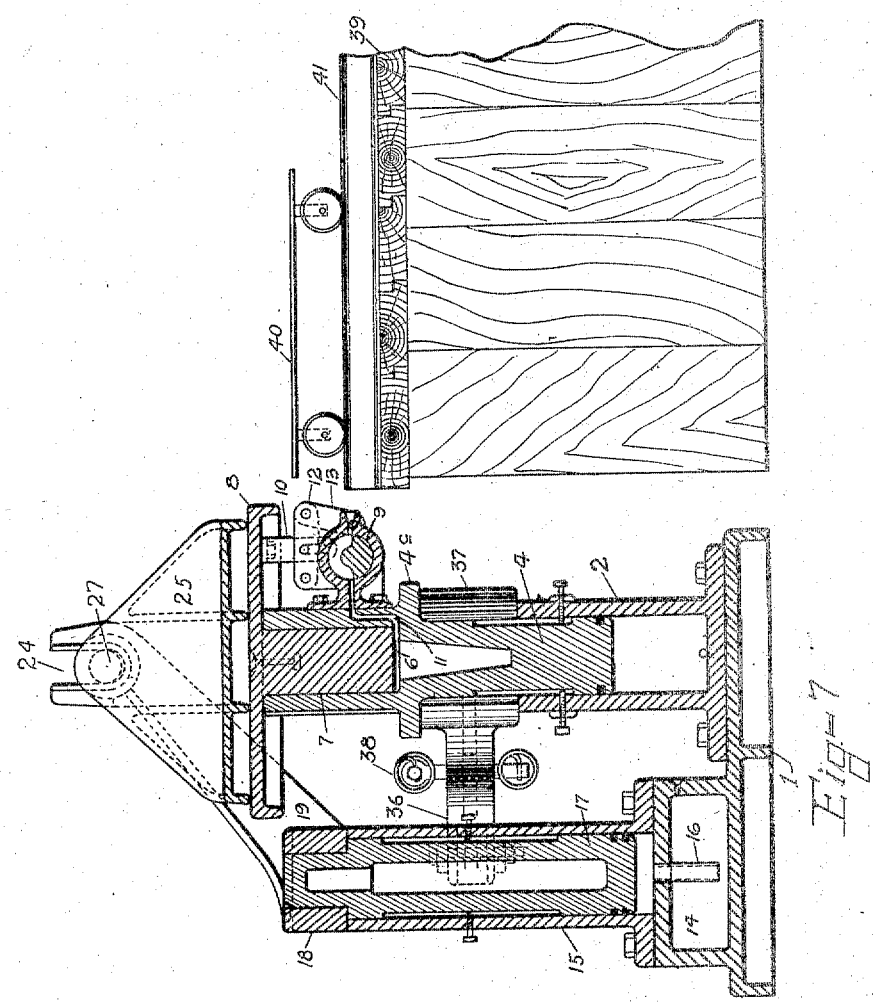

UNITED STATES PATENT OFFICE.

JOHN T. ANDERSON, OF DAVENPORT, IOWA.

JAR MOLDING-MACHINE.

1,254,385.      Specification of Letters Patent.      Patented Jan. 22, 1918.

Application filed December 14, 1914. Serial No. 877,059.

*To all whom it may concern:*

Be it known that I, JOHN T. ANDERSON, a citizen of the United States of America, and resident of Davenport, Scott county, Iowa, have invented a certain new and useful Improvement in Jar Molding-Machines, of which the following is a specification.

My invention relates to improvements in molding machines and is directed more especially to that type known as jar molding machines, and has for its objects; to provide a mechanism whereby the mold is suspended in position to be acted upon by the jarring apparatus, which apparatus is capable of dropping away from the suspended mold, permitting the mold to be inverted for withdrawal of the pattern without resorting to the usual "rock over" principle.

Another object is to provide a compact, reliable, highly efficient and comparatively inexpensive structure adapted for use in connection with molds of varying sizes and weights, and with patterns of considerable depth and with practically no draft; and a structure capable of ready conversion from a jar molding machine to a highly efficient squeezer, or a combined jarring and squeezing machine.

These and other objects which will hereinafter more fully appear, I accomplish by the mechanism shown in the accompanying drawings, in which similar reference numerals indicate similar parts throughout the several views, and in which Figure 1 is a side elevation of my improved device with parts in normal position ready to receive a mold.

Figs. 5, 6 and 7 are views similar to Figs. 1, 2 and 4, showing modified means for retaining the jarring mechanism in its operative position.

Figure 1:
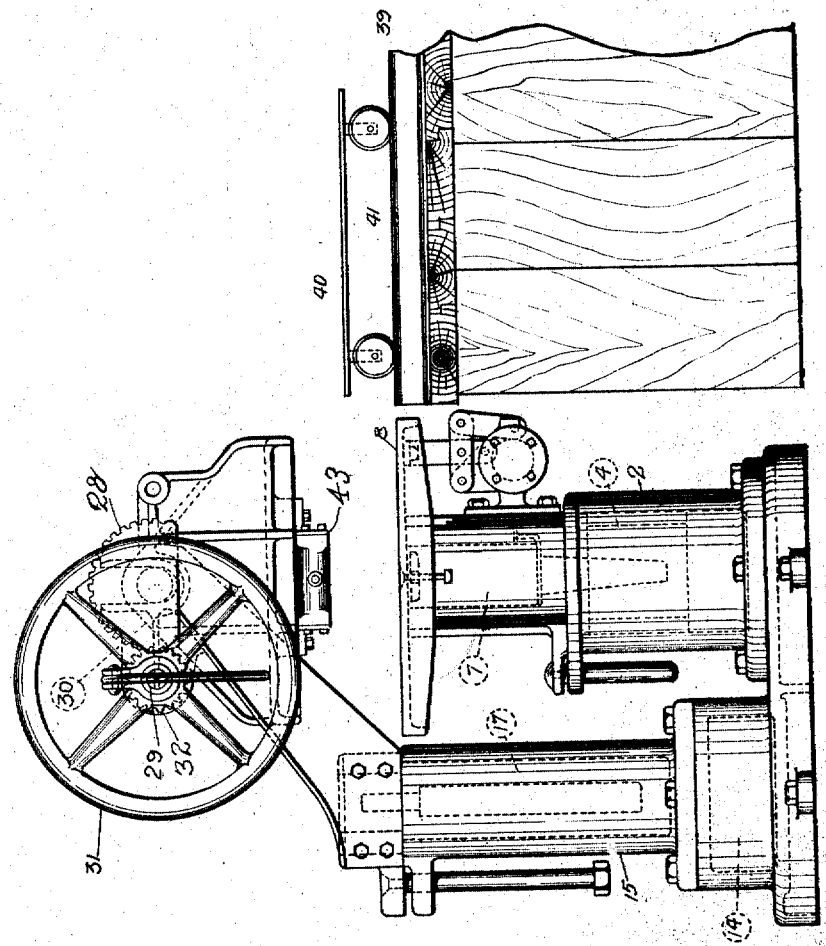

To the base 1 is bolted or otherwise secured the cylinder 2 which is closed at the lower end and provided with the gland 3 at the upper end. Fitted into this cylinder is the ram 4 provided with the enlarged head 5 and the usual packing rings $5^a$. The upward movement of the ram in the cylinder is limited by the gland 3 contacting the shoulder formed by the enlarged head. The upper portion of the ram which will hereinafter be termed the anvil is provided with the cylinder 6 for the reception of the ram 7 which is pendant from and made integral with the jarring plate 8. Made integral with and extending from the anvil 4 about midway of its length is the lug $4^a$ to which is rigidly secured the pin $4^b$, which pin passes loosely through the lug $3^a$ made integral with the gland 3. This pin being of a length somewhat greater than the limit of vertical movement of the anvil in the cylinder 2 acts as a guide to the moving anvil and prevents its rotation relative to the cylinder. Secured to the side of the anvil 4 is a revolubly reciprocating air valve 9 which is operatively connected to the jarring plate 8 by the link 10. As this valve forms no part of my present invention, a further description thereof is deemed unnecessary other than to state that it admits compressed air through the port 11 into the cylinder 6, forcing the ram 7 upward until the air valve is rocked to "exhaust" position through the sliding connection of the link 10 to the members 12 and 13, when the weight of the mold on the jarring table causes the ram 7 to drop, at which instant the valve is again rocked to "supply" position immediately raising the ram. This raising and falling or reciprocation of the ram 7 and jarring plate will continue until the supply of compressed air is shut off from the air valve 9.

The base is also provided with the chambered portion 14 forming an oil well, to the upper surface of which is secured the cylinder 15. To the lower closed end of the cylinder the oil tube 16 is fitted. This tube passes into the chamber 14 through an opening in the upper wall of the chamber. Snugly fitted for vertical reciprocation in the cylinder 15 is the ram 17, to the upper end of which is securely fastened a yoke-like member consisting of the cross-bar 18, and the forwardly and upwardly extending arms 19—19. To the lug 20 extending from and made integral with the cross bar 18, is rigidly secured the guide pin 21 which is caused to pass loosely through the lug 22 extending from the cylinder 15 and functioning to prevent the rotation of the ram 17 in the cylinder. This pin is provided with the head 23, forming a stop to the upward movement of the ram. The outer free ends of the arms 19 are provided with the deep U shaped bearings 24. The mold carrier 25 is suspended from these bearings by the trunnions 26 and 27. Trunnion 27 is extended sufficiently beyond the bearing 24 to receive the half-gear 28, which is rigidly secured thereto. Adjacent to and parallel with the trunnion 27 is the shaft 29, which is supported by the bracket 30 made integral with the arm 19. Mounted on this shaft is the hand wheel 31 and the pinion 32, which is capable of meshing engagement with the half-gear 28. Normally it is held out of such engagement by the coil spring 33. By forcing same into mesh with the gear 28 and giving it a full turn by the hand wheel 31, the gear is given a half turn and the mold carrier is inverted from normal to position shown in dotted lines in Figs. 3 and 4.

Figure 2:
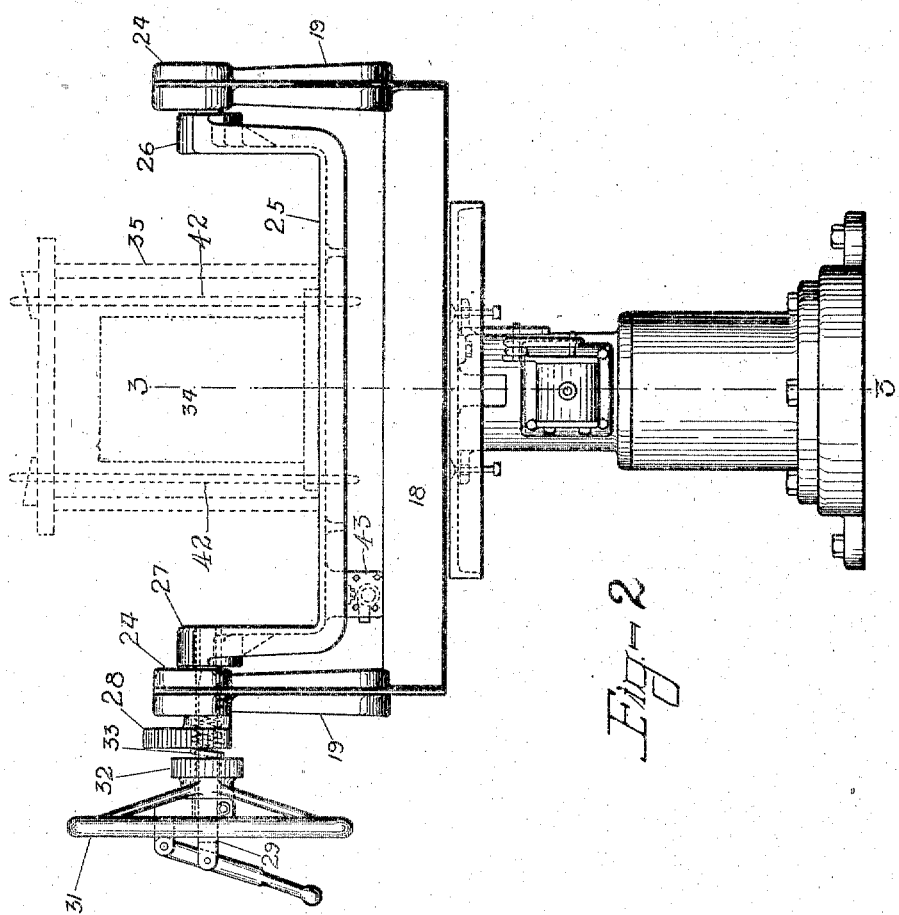
Fig. 2 is a front elevation showing a flask clamped in position on the mold carrier.
Figure 4:
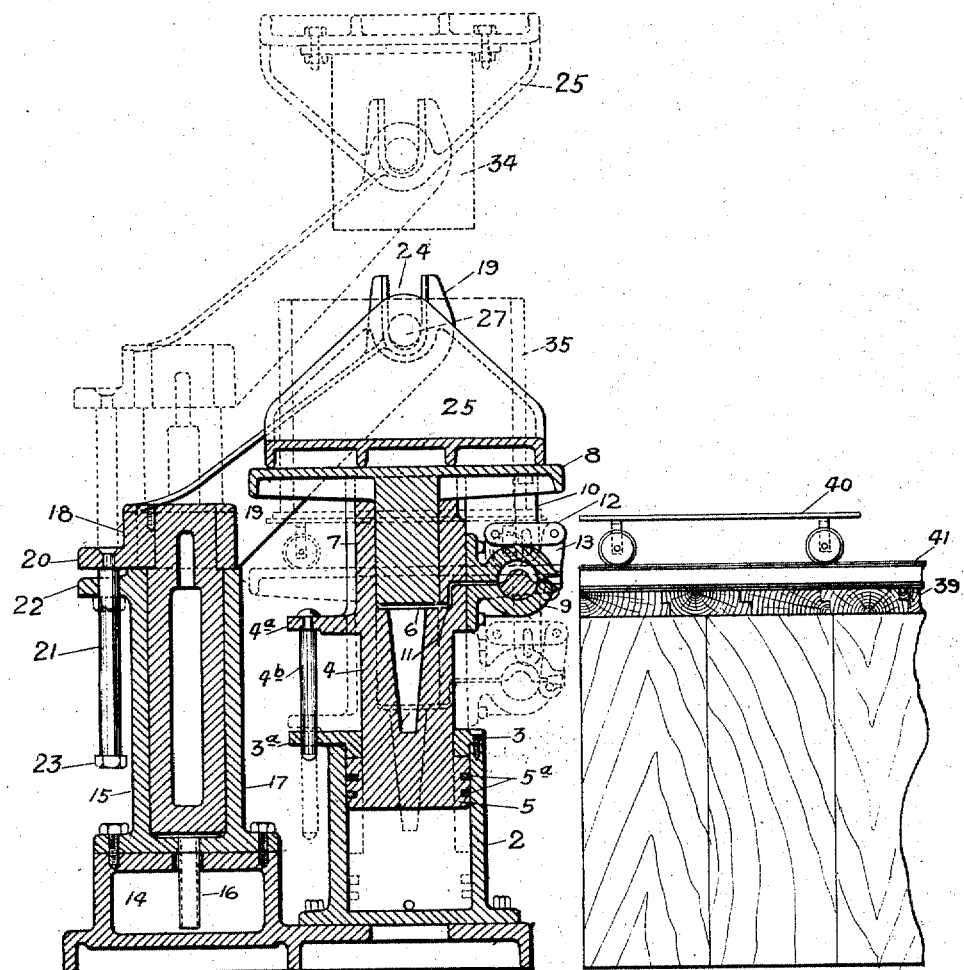
Fig. 4 is a similar view showing the jarring apparatus in operative position in full lines and also showing the pattern after withdrawal in dotted lines.

A pattern 34, of any desired form, from which a mold is to be made is securely fastened to the mold carrier 25, as shown in dotted lines in Figs. 2 and 4. The flask 35 is placed around the pattern and filled with molding sand in the usual manner. Compressed air is then admitted into the lower end of cylinder 2 and the ram 4 moves up to its uppermost position in the cylinder, bringing the jarring plate 8 in contact with the underside of the mold carrier 25, lifting it slightly out of the bearings 24.

Figure 5:
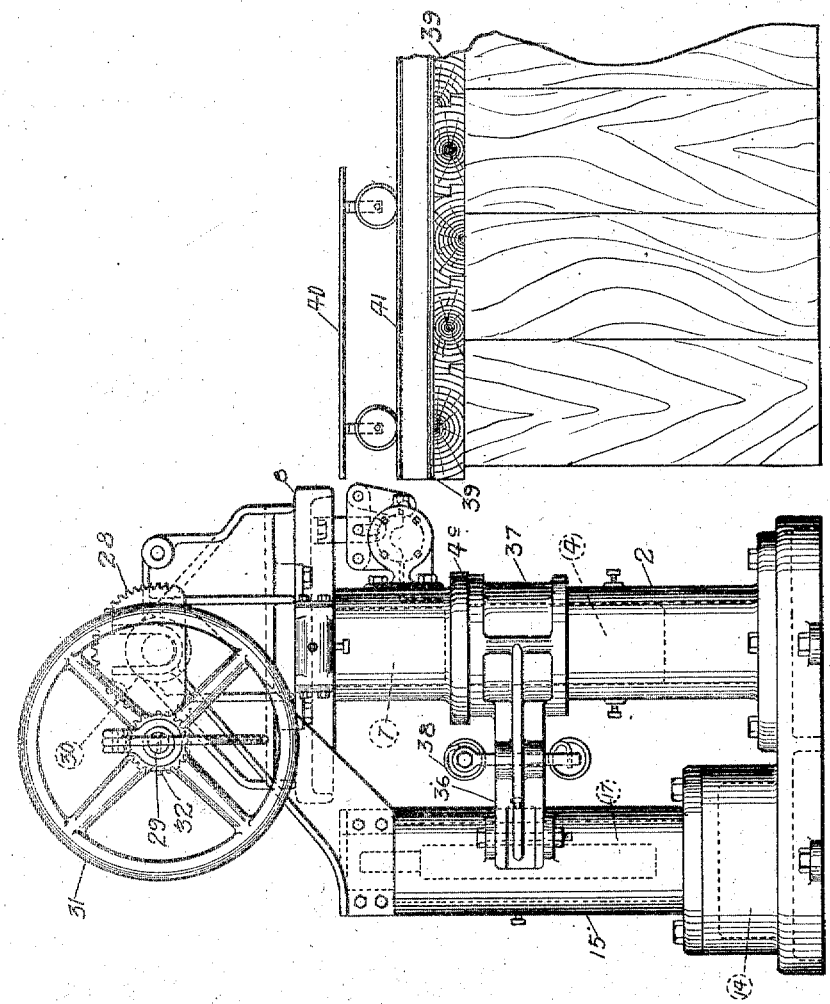

With air at a sufficient pressure to unyieldingly hold ram 2 in its uppermost position and with jarring plate 8 in contact with mold carrier 25, air is admitted into valve 9 causing the reciprocation of ram 7 as above explained, and the free raising and falling of the mold carrier in the bearings 24. When the mold has been sufficiently jarred to properly ram the sand about the pattern, the air is released from cylinder 2 permitting ram 4 with its jarring plate to drop away from the mold carrier 25, leaving same suspended in the bearings 24. It is to be understood that the admission of air into cylinder 2 is in no manner to be connected with the jarring action of the device other than to form a solid unyielding anvil to receive the force of the falling mold during the act of being jarred or jolted. The area of the piston in conjunction with the pressure of the air employed determines the maximum weight of the mold, the falling force of which is to be unyieldingly resisted. If air of sufficient pressure to unyieldingly resist the falling force of an excessively heavy mold is not available, the device shown in Figs. 5, 6 and 7 may be employed.

This consists of the arms 36 hinged at one end to opposite sides of the cylinder 15 and provided at the other end with the semi-circular jaws 37 which, when closed, completely envelop the ram 4 under the flange 4 and rest upon the upper end of the cylinder 2, thus forming a solid anvil to receive the force of the falling mold. These jaws, on being opened by any suitable means such as air cylinders 38 permit the ram 4 to drop upon release of the air from the cylinder. If a mold is to be made from an unusually delicate pattern that could not withstand ordinary heavy jolting, or if the casting to be produced is of a nature calling for a loosely rammed mold, the falling force of the mold, during the act of jarring may be suitably cushioned by the employment of low pressure air for raising the jarring plate and maintaining same in operative position.

Figure 3:
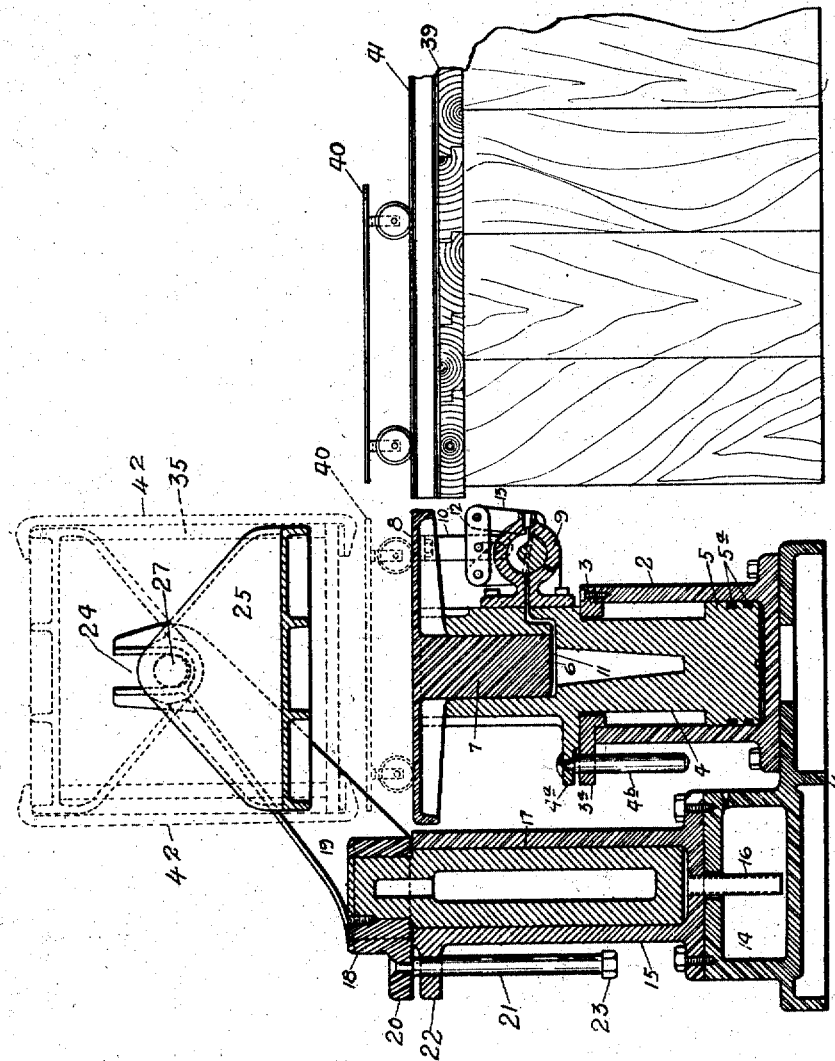
Fig. 3 is a vertical cross-section with parts in position preparatory to the withdrawing of the pattern.

After the jarring plate has been lowered and the mold is suspended from the bearings 24 as above indicated, the pinion 32 is caused to engage the half gear 28 and given a full turn by the hand wheel 31 inverting the mold carrier 25, and the flask which has been clamped thereto, as shown in dotted lines in Fig. 3. For the convenience of the operator, the entire machine is located in a pit having a floor line as indicated at 39. A small four wheeled truck 40 may be provided and arranged to operate on the track 41 terminating at the edge of the pit with its upper surface in the plane of the upper face of the jarring plate 8 and in alinement with grooves or channels not shown cut in the face of the plate for the accommodation of the truck wheels, so that the truck can readily be passed from the track on to the plate and vice versa. With the truck 40 resting on the plate 8 as shown in dotted lines in Figs. 3 and 4 and the flask 35 resting on the truck, the clamps 42 are removed and the pattern 34 is ready for withdrawal. This is accomplished by admitting air into the lower end of cylinder 15, which will cause the ram 17 and yoke 19 together with the mold carrier 25 to slowly rise to the position as shown in dotted lines in Fig. 4, carrying the pattern 34, which is secured to the mold carrier, with it.

During the act of withdrawing the pattern, a vibrator 43 of usual construction, and which is secured to the mold carrier, is set in action, rapping the pattern aiding in its withdrawal by lessening the probable tearing down of the sand mold. The truck with the finished mold is then pushed off the machine on to the track 41 and the machine prepared for another mold.

Having thus described the nature and objects of my invention, what I claim as new is:

1. In a jar molding machine, a mold carrier, pattern withdrawing means consisting of a fluid pressure cylinder, a ram slidably engaging said cylinder and provided with upwardly and forwardly extending arms having pivotal engagement with said mold carrier; mold carrier inverting means secured to said pattern withdrawing means, and means independent of said pattern withdrawing means adapted to impart a jolting action to said mold carrier.

2. In a machine of the class set forth, a mold carrier, a vertically-movable support therefor, means for inverting the mold carrier, and means for jarring the mold carrier embodying a cylinder and ram, said ram being provided in its upper end with a supplemental ram cylinder, means carried by the ram for admitting fluid-pressure into said supplemental ram cylinder, said means being movable vertically with the ram, and a jarring plate provided with a supplemental ram working in said supplemental ram cylinder.

Signed by me at Davenport Iowa this 10th day of December 1914.

JOHN T. ANDERSON.

Witnesses:
　CARRIE L. VAN TUYL,
　KATHRYN MAHAN.